United States Patent [19]
Hanson

[11] 4,228,891
[45] Oct. 21, 1980

[54] ADJUSTABLE IDLER ROLL

[76] Inventor: William Hanson, 428 N. Broadway, New Philadelphia, Ohio 44663

[21] Appl. No.: 6,648

[22] Filed: Jan. 26, 1979

[51] Int. Cl.³ .................... B65G 15/08; B65G 39/16
[52] U.S. Cl. ............................................................ 198/827
[58] Field of Search ............... 198/823, 824, 825, 826, 198/827, 828, 830, 842

[56] References Cited

U.S. PATENT DOCUMENTS

| | | | |
|---|---|---|---|
| 3,191,761 | 6/1965 | Reilly | 198/828 |
| 3,212,626 | 10/1965 | McLeish et al. | 198/827 X |
| 3,246,736 | 4/1966 | Lo Presti | 198/827 |
| 3,262,551 | 7/1966 | De Waal | 198/830 X |
| 3,356,206 | 12/1967 | Lantz | 198/828 |

FOREIGN PATENT DOCUMENTS

| | | | |
|---|---|---|---|
| 952094 | 3/1964 | United Kingdom | 198/827 |
| 585115 | 12/1977 | U.S.S.R. | 198/827 |

*Primary Examiner*—James L. Rowland
*Attorney, Agent, or Firm*—Cushman, Darby & Cushman

[57] ABSTRACT

A device for adjusting or cocking an idler roll assembly so as to control the path of the belt in a conveyor belt system. A hook attached to at least one end of the idler roll assembly is hooked across a horizontal shaft having spacer structure, on top of a support stand, so that the idler roll assembly may be set at a desired angle with respect to the direction of travel of the belt and also may easily be adjusted. In one embodiment of the invention, the spacer structure include washers slidably mounted on the horizontal shaft with sufficient space left on the shaft to receive the hook.

4 Claims, 4 Drawing Figures

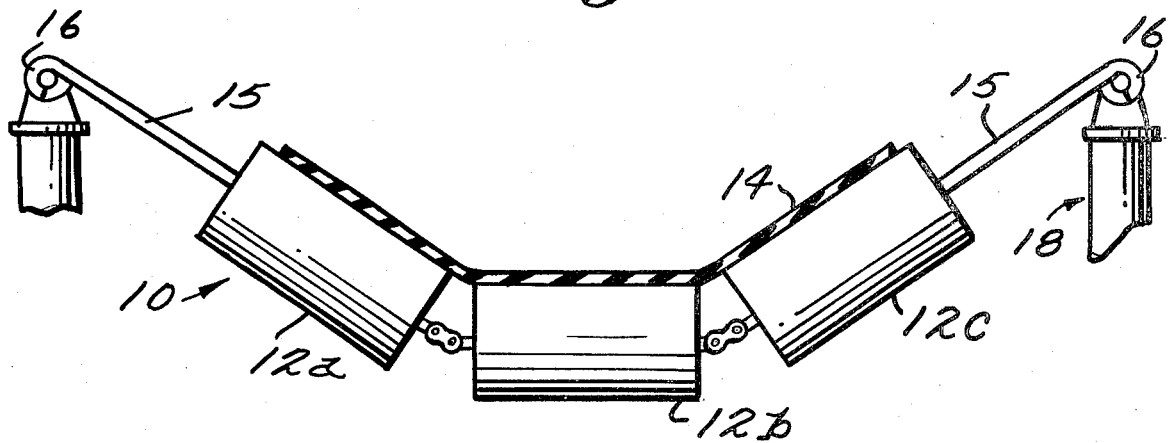
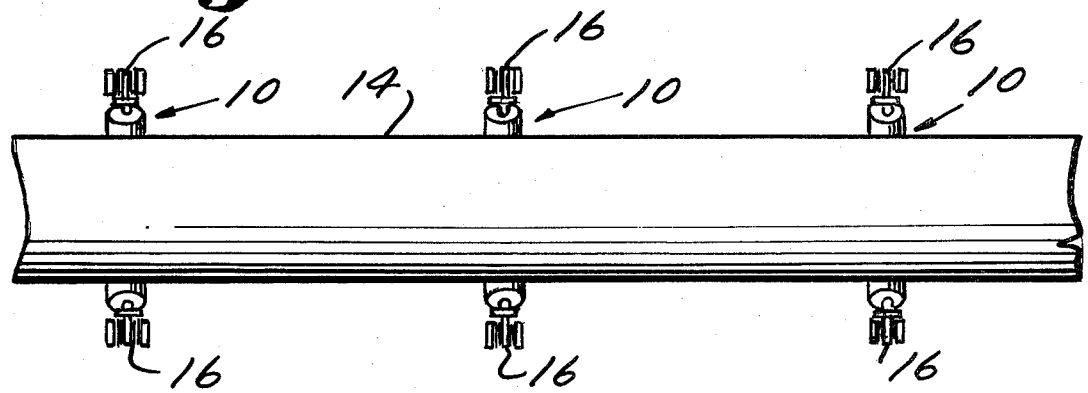
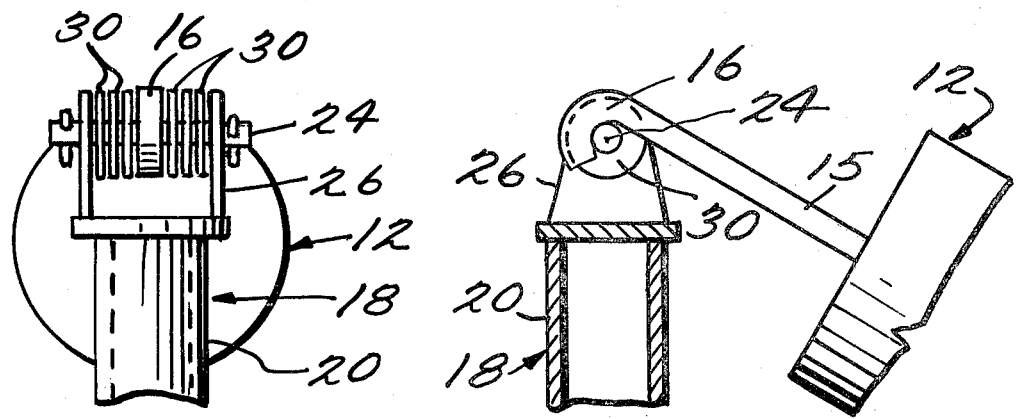

ADJUSTABLE IDLER ROLL

BACKGROUND

This invention relates to the idler rolls which support the belt in a conveyor belt system, or more particularly to means for adjusting or "cocking" the idler rolls so as to train or control the path of the belt.

The most common means for adjusting the idler rolls of belt conveyors so as to control the path of the belt is to provide adjusting slots in the mounting feet of the conveyor belt system so that the center axis of the roll or series of rolls can be placed at an angle from the center line of the belt which is different than 90°. This adjustment can be made either in the direction of belt travel or in the opposite direction depending upon the characteristics of the belt and the type and position of the load. Such means of adjustment using slots have until now required the use of nuts and bolts, clamps or other hardware which must be loosened and then tightened each time an adjustment is made. Adjustments made by such means may be quite time consuming, particularly where the conveyor is long and comprises numerous idlers to be adjusted.

BRIEF SUMMARY OF THE INVENTION

The present invention overcomes the above-mentioned disadvantages. In accordance with the present invention, a means is provided for the adjustment of an idler roll assembly without the use of slots and accompanying bolts and nuts or other hardware, so that adjustment can be made without the use of any tools and without requiring any loosening or tightening of any auxiliary hardware or clamps. In accordance with the invention, an idler roll or series of idler rolls, either linked together or mounted on a support bracket to form an idler roll assembly, has attached to at least one end thereof a hook. On top of a mounting stand or the like which supports the idler assembly on one side is a shaft mounted with its axis generally parallel to the direction of travel of the conveyor belt. Spacer means are utilized for positioning the hook along the shaft so that the idler arm may be fixed at some selected angle with respect to the center line of the belt. For example, teeth having spaces therebetween may be fixedly mounted on top of the shaft, a series of holes may be established along the top of the shaft or, preferably, a series of washers (any suitable discs having holes therethrough) may be slidably mounted on the shaft with sufficient space left on the shaft to receive the hook. Suitably, the shaft may be fixed to the mounting stand by a support bracket having a double lug, the shaft being inserted through each leg of the lug.

In the embodiment using washers, the invention has the additional advantages of extra sturdiness without requiring any machining of the various locations that the adjustable idler hook may be inserted, as well as the principal advantages discussed above.

Further objects and advantages will be apparent from the following description taken in connection with the drawings.

BRIEF DESCRIPTION OF THE DRAWINGS

FIG. 1 illustrates a front view of an adjustable idler roll assembly in accordance with the present invention;

FIG. 2 illustrates a plan view of a conveyor belt system utilizing adjustable idler roll assemblies in accordance with the present invention;

FIG. 3 is a detailed front view of a hook attachment used in an adjustable idler assembly in accordance with the present invention; and FIG. 4 is a detailed side view, partly broken away, of the hook arrangement shown in FIG. 3.

DETAILED DESCRIPTION OF THE PREFERRED EMBODIMENT

Referring first to FIG. 1, an idler roll assembly generally referred to by the numeral 10, is shown having a series of idler roll elements 12 hingedly connected at their ends for motion in the vertical plane. On top of the idler rolls is a conveyor belt 14. Rigidly mounted to the end idler rolls 12A and 12C of the idler roll assembly 10, are arms 15 having hooks 16 at their respective ends for hooking to suitable support means as will be described.

A series of idler roll assemblies 10 supporting a single conveyor belt 14 to form a conveyor belt system is shown in FIG. 2.

The support means for each idler assembly 10 is illustrated in FIGS. 3 and 4. The support means suitably comprises support stands 18, each of which includes a shaft 20 rigidly maintained in an upright position by feet (not shown in the Drawings). Each support stand 18 has mounted on top thereof a horizontal shaft 24 with its axis parallel to the direction of travel of the conveyor belt 14 for vertically supporting a hook 16. Suitably, the shaft 24 may be fixed to the support stand by a support bracket 26 having a double lug, the shaft 24 being inserted through each leg of the lug.

A spacer means may be utilized for positioning the hook along the shaft so that the idler arm 15 may be fixed at some selected angle with respect to the center line of the belt 14. The spacer means may suitably include a series of washers 30 (any suitable discs having holes therethrough) slidably mounted on the shaft 24 with sufficient space left on the shaft to receive the hook 16. The washers have widths respectively less than the width of the hook so that it is possible to adjust the angle of the idler roll assembly with great precision. While washers or discs are preferred because of their simplicity, ease of construction, and flexibility in establishing any angle of the idler arm with respect to the center line of the belt, other means for fixing the hook on the shaft such as teeth having spacers therebetween, or a series of holes in the top of the shaft, are other spacer means by which the angle of the idler arm may be set. Since the mounting means described can be used at both ends of the idler assembly, the center line of the idler assembly can thus be held at a variety of angles other than 90 degrees to the center line of the belt.

While one form in which the present invention may be embodied has been shown and described, it will be understood that various modifications and variations thereof may be effective without departing from the spirit and scope of the invention as defined by the appended claims.

What is claimed is:

1. An apparatus for adjusting an idler roll assembly having at least one idler roll in a belt conveyor comprising: support means, including a shaft disposed parallel in the direction of movement of said conveyor, for suspendably supporting said at least one idler roll; a hook having a given width rigidly attached to at least one end of said idler assembly for hooking across said shaft; said support means having spacer means for securing said hook at any one of a plurality of positions on said shaft parallel to the direction of movement of said conveyor; said spacer means comprising a series of slidable disk elements having widths respectively less than said given width and holes therethrough slidably mounted on said shaft in such number that said hook may be snugly hooked across said shaft between any adjacent two elements of said series of elements or at either end of said series of elements.

2. An apparatus as in claim 1 wherein said support means comprises at least one support stand.

3. An apparatus as in claim 2 wherein said support stand comprises a double lug, said shaft being mounted through each leg of said lug.

4. The apparatus of claim 1 wherein said slidable elements comprise washers.

* * * * *